A. A. TIRRILL.
ELECTRICAL REGULATOR.
APPLICATION FILED OCT. 5, 1911.
1,147,572.
Patented July 20, 1915.
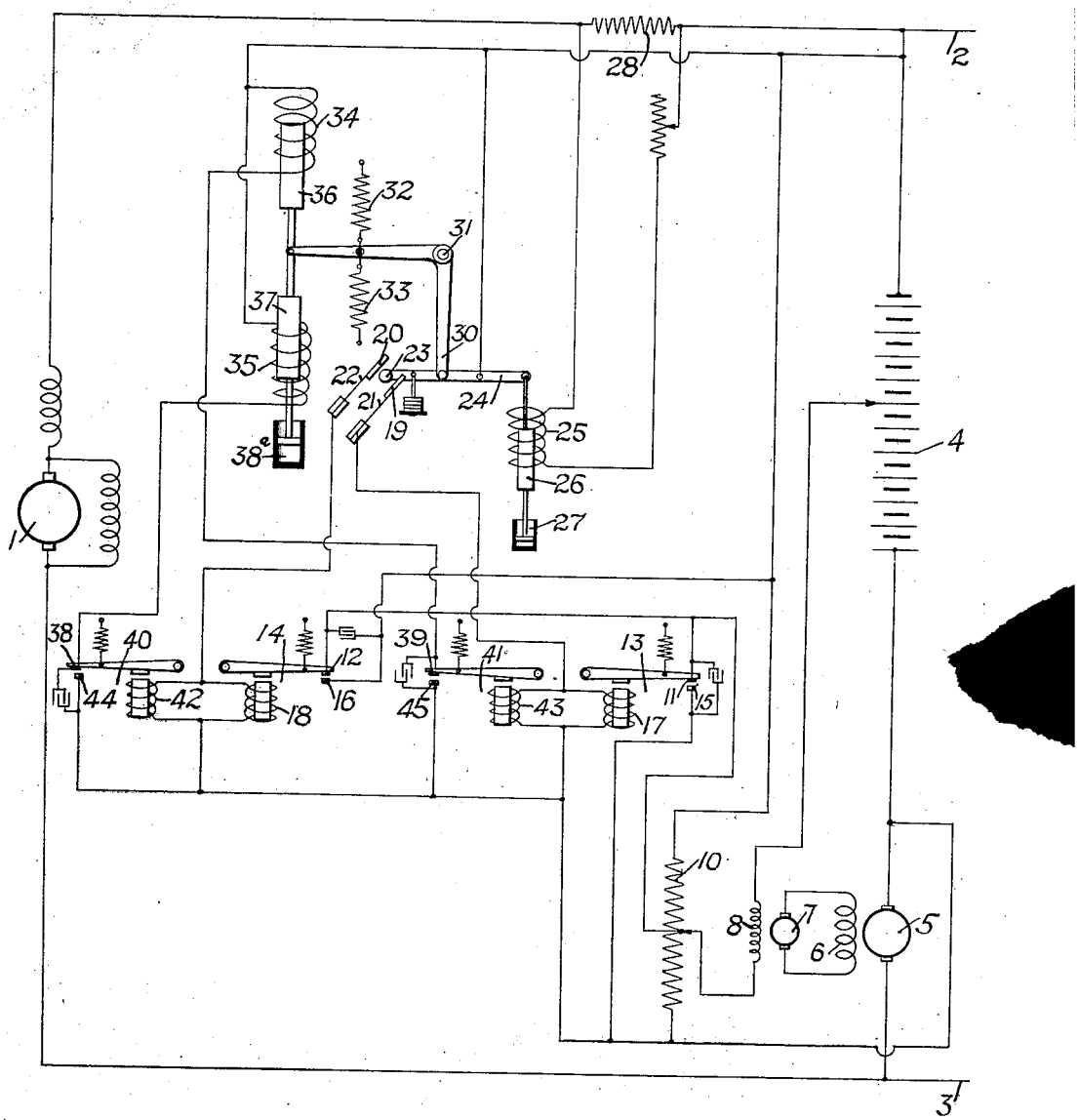
WITNESSES:
INVENTOR
Allen A. Tirrill
BY
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL REGULATOR.

1,147,572.    Specification of Letters Patent.    Patented July 20, 1915.

Application filed October 5, 1911. Serial No. 653,013.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators, and particularly to such regulators as are employed for the purpose of regulating the charging and discharging of storage batteries.

The object of my invention is to provide a simple and effective regulator adapted for use in systems of distribution in which storage batteries are employed for relieving a generator of fluctuations in load.

The single figure of the accompanying drawing diagrammatically illustrates a system of distribution embodying my invention.

A system in connection with which the present invention may be conveniently employed comprises a main generator 1 that supplies current to a distributing circuit 2—3, between the conductors of which a storage battery 4 and the armature 5 of a booster generator are connected in series. The booster generator is provided with a field magnet winding 6 that is supplied with current from the armature 7 of an exciter, having a field magnet winding 8 that is connected between the middle, or other suitable intermediate points of the battery and a resistor 10, the terminals of the resistor being connected to the terminals of the battery. The said intermediate point of the resistor 10 is also connected to movable contact terminals 11 and 12 which constitute parts of two relays 13 and 14, the terminals 11 and 12 being adapted to coöperate with corresponding opposite terminals 15 and 16, that are respectively connected to the terminals of the resistor 10. The relays 13 and 14 are respectively provided with electromagnet windings 17 and 18 for actuating the movable contact terminals 11 and 12, one terminal of each of said windings being connected to one terminal of the battery, and the remaining terminals thereof being connected, respectively, to stationary opposing contact terminals 19 and 20 of the main regulating mechanism. The contact terminals 19 and 20 are resiliently mounted, as, for instance, by being secured to the free ends of plate springs 21 and 22, the other ends of which are clamped to stationary posts, and they are, in the present instance, arranged with their contact faces inclined to the vertical.

The contact terminals 19 and 20 are placed upon opposite sides of and are adapted to coöperate with, a movable spherical contact terminal 23 that is mounted upon one end of a lever 24 and is connected to the terminal of the battery opposite to the connection thereto of the terminals of the windings 17 and 18. The lever 24 is actuated by means of an electromagnet winding 25 having a core 26 that is suspended from the lever and the movements of which are preferably somewhat retarded by means of a dash pot 27. The winding 25 receives current proportional to that traversing the distributing circuit conductor 2 between the generator 1 and the point of connection thereto of the battery 4, and, to this end, it is preferably connected to the terminals of a resistor 28 that is connected in series with the said distributing circuit conductor. The winding 25 accordingly serves to adjust the distance of the spherical contact terminal 23 from the resiliently mounted stationary terminals 19 and 20 in accordance with variations of the load upon the generator 1.

The lever 24 is fulcrumed to one end of a bell crank lever 30 having a stationary fulcrum point at 31, the bell crank lever being acted upon by opposing springs 32 and 33, or provided with other suitable centralizing means for the lever. The bell crank lever is adapted to be actuated by the one or the other of two electro-magnet windings 34 and 35 having cores 36 and 37, respectively, that are suitably connected to the said lever. The movements of the cores 35 and 36, and the lever 30, are preferably somewhat retarded, as, for instance, by means of a dash pot 38ª. One terminal of each of the windings 34 and 35 is connected to one terminal of the battery 4, and the other terminals thereof are respectively connected to movable contact terminals 38 and 39 that constitute parts of relays 40 and 41 the said relays having actuating windings 42 and 43 that are connected in parallel with the windings 18 and 17 of the relays 13 and 14. The contact terminals 38 and 39 are adapted to engage and disengage stationary contact terminals 44 and 45, respectively, that are connected to the terminal of the battery opposite to that to which the common terminal of the windings 34 and 35 is connected. It is evident that the relay 40 controls the circuit of the winding 35, and serves to establish and interrupt the same, according as the contact terminals 20 and 23 engage or disengage, and also that the relay 41 serves to establish and interrupt the circuit of the winding 34, according as the contact terminals 19 and 23 engage or disengage. Thus the relays 40 and 41 are controlled in their operation, in exactly the same manner as are the relays 13 and 14.

The operation of the system will be best understood from a consideration in detail of the conditions that are caused to exist with variations of load upon the distributing circuit.

When the load upon the distributing circuit is less than its normal value, the amount of current that traverses the resistor 28, will be correspondingly diminished, as well as the current traversing the winding 25. The result is that the spherical contact terminal 23 is moved into engagement with the stationary contact terminal 20, thereby establishing the circuits of the relay-actuating windings 18 and 42. The contact terminal 12 is then caused to engage stationary contact terminal 16, thereby shunting the upper portion of the resistor 10. The exciter field magnet winding 8 is then traversed by current received from the battery in such a direction that the booster electromotive force opposes that of the battery 4, thus causing the battery to charge with current received from the generator 1. At the same time that the contact terminal 12 engages the stationary terminal 16, the contact terminal 38 is also caused to engage stationary terminal 44 in order to establish the circuit of the actuating winding 35 for the bell crank lever 30, the spherical contact terminal 23 being thereby moved out of engagement with the terminal 20. Upon disengagement of the contact terminals 20 and 23, the relay contact terminals 12 and 38 become disengaged from the terminals 16 and 44, with the result that the shunt circuit to the upper portion of the resistor 10 is interrupted, as well as the circuit of the winding 35. This is followed by a slight diminution of the current traversing the resistor 28 and the winding 25, with the result that the contact terminal 23 is again moved into engagement with the terminal 20. The regulator continues to operate in this manner, with the contact terminal 23 moving into and out of engagement with the terminal 20, and the relays 14 and 40 being operated correspondingly, so long as the load upon the distributing circuit continues below its normal value, the upper portion of the resistor 10 being shunted for longer or shorter periods of time, according to the value of the load and in such manner that the exciter field will be of such value and direction as to cause the booster electromotive force to oppose that of the battery electromotive force and cause it to charge at a rate varying with the load.

When the load upon the distributing circuit is of substantially its normal value, the battery should "float" upon the system, that is, it should neither charge nor discharge. Under this condition, the resistor 28 and the winding 25 will be traversed by such amounts of current that the contact terminal 23 will be maintained substantially equidistant from the contact terminals 19 and 20, so that all of the relay contacts remain out of engagement and neither of the windings 34 and 35 can then actuate the lever 30 and the contact terminal 23.

When the load upon the distributing circuit is greater than its normal value, the battery 4 should be caused to discharge and to thus relieve the generator 1 from a portion of the load, and in such manner that the load upon the generator 1 will be maintained substantially uniform. With an increase of the load upon the distributing circuit, there is an increase in the amount of current traversing the winding 25, which, thereupon, moves the contact terminal 23 into engagement with the terminal 19, thus establishing the circuits of the relay-actuating windings 17 and 43. The contact terminal 11 is then brought into engagement with the stationary terminal 15, and the lower portion of the resistor 10 is thus shunted. The exciter field magnet winding 8 is then traversed by current in such a direction that the booster electromotive force is caused to supplement that of the battery 4, thus causing the battery to discharge. Upon energization of the relay-actuating winding 43, the contact terminal 39 is brought into engagement with the terminal 45, with the result that the actuating winding 34 for the bell crank lever 30 is energized, and the contact terminal 23 is thereby moved out of engagement with the terminal 19. When the battery discharges, there is a diminution of the current traversing the winding 25, with the result that the contact terminal 23 is raised slightly, this tending also to effect separation thereof from the terminal 19.

After the terminals 19 and 23 disengage, the circuit of the winding 34 is deënergized and the booster electromotive force is somewhat diminished, with the result that a slightly increased current is then supplied by the generator 1, and a slightly increased current traverses the winding 25, so that the contact terminal 23 is again brought into engagement with the terminal 19. So long as the load upon the distributing circuit continues above its normal value, the regulator continues to operate in this manner, the contact terminal 23 being moved into and out of engagement with the terminal 19, the relays 13 and 41 operating correspondingly, and the periods of establishment and interruption of the shunt to the lower portion of the resistor 10 being in such relation to each other that the booster electromotive force is caused to supplement that of the battery, so as to cause the battery to discharge and carry its proper proportion of the load.

If desired, the exciter may be omitted and the field magnet winding 6 of the booster may be connected between the intermediate points of the resistor and the battery, so that the excitation of the booster may be controlled directly by the regulator.

Other modifications may obviously be made in the regulator and its connections, and the regulator may be employed for other purposes and in other relations than those specifically disclosed herein without departing from the spirit of the invention.

I claim as my invention:

1. An electrical regulator comprising coöperating but normally disengaged contact terminals, means including windings for causing one of said terminals to engage one or another of the remaining terminals, and relays controlled in their operation by the said contact terminals and in turn controlling the circuits of the said windings.

2. An electrical regulator comprising coöperating contact terminals, means including windings for causing one of said terminals to engage one or another of the remaining terminals, and relays controlled in their operation by the said contact terminals and in turn controlling the circuits of the said windings.

3. An electrical regulator comprising coöperating but normally disengaged contact terminals, means including windings for causing one of said terminals to engage one or another of the remaining terminals, means for varying the distance between the former and the latter terminals, and relays controlled in their operation by the said contact terminals and in turn controlling the circuits of the said windings.

4. An electrical regulator comprising coöperating contact terminals, means including windings for causing one of said terminals to engage one or another of the remaining terminals, means for varying the distance between the former and the latter terminals, and relays controlled in their operation by the said contact terminals and in turn controlling the circuits of the said windings.

5. An electrical regulator comprising a pair of spaced stationary but resiliently mounted contact terminals, a movable contact terminal, means for actuating the movable contact terminal to cause the same to engage and disengage the stationary contact terminals, and means for varying the initial distances of the movable contact terminal from the stationary terminals.

6. An electrical regulator comprising a pair of spaced contact terminals, a member movable relatively to and between the said contact terminals, means including windings for causing engagement and disengagement between the said member and contact terminals, relays controlled in their operation by the engagement and disengagement of the said parts and in turn controlling the circuits of said windings, and means for varying the initial distance between the said engaging and disengaging parts.

7. An electrical regulator comprising a pair of spaced contact terminals, a member movable relatively to and between the said contact terminals, a lever for causing engagement and disengagement between the said member and contact terminals, an actuating winding for the said lever, a second lever providing a fulcrum for the aforesaid lever, and two windings respectively for actuating the said second lever in opposite directions.

8. An electrical regulator comprising a pair of spaced contact terminals, a member movable relatively to and between the said contact terminals, a lever for causing engagement and disengagement between the said member and contact terminals, an actuating winding for the said lever, a second lever providing a fulcrum for the aforesaid lever, two windings respectively for actuating the said second lever in opposite directions, and relays controlled in their operation by the engagement and disengagement between the said movable member and contact terminals, the said relays in turn controlling the energization of the two actuating windings for the second lever.

In testimony whereof, I have hereunto subscribed my name this 3rd day of October, 1911.

ALLEN A. TIRRILL.

Witnesses:
OTTO S. SCHAIRER,
B. B. HINES.